United States Patent

Hirabayashi (10) Patent No.: US 10,541,613 B2
(45) Date of Patent: Jan. 21, 2020

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/976,240

(22) Filed: May 10, 2018

(65) Prior Publication Data

US 2018/0335747 A1   Nov. 22, 2018

(30) Foreign Application Priority Data

May 18, 2017 (JP) ................................ 2017-098969

(51) Int. Cl.
| | |
|---|---|
| *H02M 3/158* | (2006.01) |
| *H02M 1/42* | (2007.01) |
| *H02M 7/10* | (2006.01) |
| *H02M 3/156* | (2006.01) |
| *H02M 3/07* | (2006.01) |

(52) U.S. Cl.
CPC ....... *H02M 3/1582* (2013.01); *H02M 1/4225* (2013.01); *H02M 3/156* (2013.01); *H02M 3/158* (2013.01); *H02M 7/103* (2013.01); *H02M 3/07* (2013.01)

(58) Field of Classification Search
CPC ......... H02M 3/07; H02M 3/156; H02M 3/158
See application file for complete search history.

(56) References Cited

U.S. PATENT DOCUMENTS

| | | | | |
|---|---|---|---|---|
| 5,572,414 A | * | 11/1996 | Komori | G03G 15/80 363/60 |
| 6,759,766 B2 | * | 7/2004 | Hiratsuka | B41J 2/04541 307/110 |
| 7,372,318 B2 | * | 5/2008 | Scratchley | H02M 3/07 327/331 |
| 8,102,685 B2 | | 1/2012 | Nagasaki et al. | |
| 8,325,503 B2 | | 12/2012 | Nagasaki et al. | |
| 8,767,417 B2 | * | 7/2014 | Lin | H02M 3/3353 363/21.12 |

(Continued)

FOREIGN PATENT DOCUMENTS

JP   5627607 B   11/2014

OTHER PUBLICATIONS

U.S. Appl. No. 15/976,217, filed May 10, 2018. Applicant: Jun Hirabayashi.

*Primary Examiner* — Yusef A Ahmed
*Assistant Examiner* — Ishrat F Jamali
(74) *Attorney, Agent, or Firm* — Venable LLP (57) ABSTRACT

The power supply apparatus includes an inductor; a switching element connected to another end of the inductor, the switching element configured to drive the inductor by being turned on or turned off in accordance with an input pulse signal; a boost converter circuit connected to both ends of the inductor and including a plurality of rectification units, the boost converter circuit configured to amplify a voltage generated in the inductor, each of the plurality of rectification units including a diode and a capacitor; and a voltage boosting element configured to supply a voltage obtained by boosting an input voltage to the inductor.

17 Claims, 8 Drawing Sheets

(56) References Cited

U.S. PATENT DOCUMENTS

| | | |
|---|---|---|
| 9,306,466 B2 | 4/2016 | Hirabayashi |
| 9,343,985 B2 | 5/2016 | Hirabayashi |
| 9,904,232 B2 | 2/2018 | Hirabayashi |
| 2006/0017492 A1* | 1/2006 | Scratchley ............. H02M 3/07 327/538 |
| 2010/0148587 A1* | 6/2010 | Khaligh ................. H02M 1/10 307/72 |
| 2011/0157933 A1 | 6/2011 | Nagasaki et al. |
| 2012/0087162 A1 | 4/2012 | Nagasaki et al. |
| 2016/0349691 A1* | 12/2016 | Matsumura ........... H02M 3/158 |
| 2018/0007278 A1 | 1/2018 | Hirabayashi |
| 2018/0010739 A1 | 1/2018 | Hirabayashi |

* cited by examiner

(CONVENTIONAL EXAMPLE)

POWER SUPPLY APPARATUS AND IMAGE FORMING APPARATUS

BACKGROUND OF THE INVENTION

Field of the Invention

The present invention relates to a power supply apparatus, for example, a high-voltage power supply configured to generate a high voltage, and an image forming apparatus including the power supply apparatus.

Description of the Related Art

Figure 8:
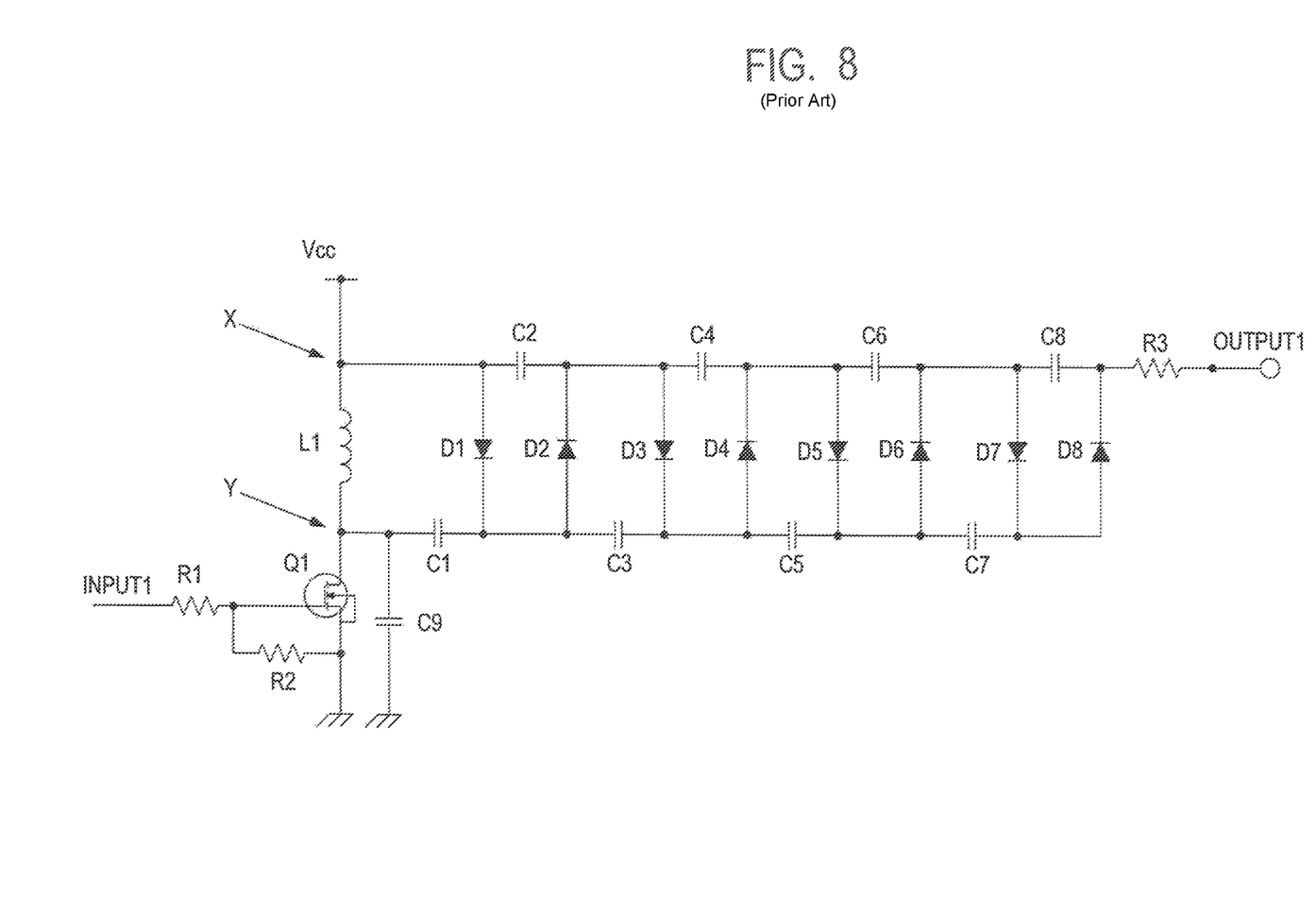
FIG. 8 is a circuit diagram of a multistage boost converter circuit in the related-art example.

Hitherto, there are various products that handle a high voltage. Examples thereof include air cleaners, air conditioners, ionizers, cathode ray tube televisions, laser printers, and particle accelerators. In many cases, a high voltage is generated by boosting a low voltage, and there are several types of circuits for generating the high voltage. Among the several types of circuits, a circuit called Cockcroft-Walton circuit is often employed. In the Cockcroft-Walton circuit, capacitors and diodes are connected to one another in a ladder-like manner to repeatedly perform charge/discharge and addition of voltages, to thereby boost the voltage. The Cockcroft-Walton circuit can be achieved with a low cost, and hence is often employed. FIG. 8 is a circuit diagram for illustrating an example of a power supply apparatus in the related art.

As an example of a boost converter circuit using the Cockcroft-Walton circuit (hereinafter referred to as "multistage rectification circuit"), for example, there is given a circuit described in Japanese Patent No. 5627607. A multistage boost converter circuit requires an AC voltage as an input voltage, and hence is often connected to an output portion of a transformer. However, in Japanese Patent No. 5627607, current flowing to an inductor is turned on and off with use of a field-effect transistor (FET) so that an AC voltage is generated at one end of the inductor. This AC voltage is input to the multistage boost converter circuit to generate a high voltage. In this manner, a boost converter circuit that is cost-efficient and area-efficient is achieved without using a transformer, which is expensive and large in size.

In order to increase the maximum output voltage of the above-mentioned Cockcroft-Walton circuit, the simplest method therefor involves increasing the number of stages of the multistage rectification circuit. However, as easily imagined, an increase of the number of stages of the multistage rectification circuit results in an increase of the cost and the area thereof. In addition, it does not necessarily follow that the maximum output voltage can be amplified at the same rate as a rate at which the number of stages of the multistage rectification circuit is increased. As the voltage rises higher, more leakage currents are accumulated in each element, and hence the rate at which the maximum output voltage is increased is lower than the rate at which the number of stages is increased. Consequently, it is preferred that the number of stages of the multistage rectification circuit be not too large.

Further, as other methods for increasing the maximum output voltage, for example, there are given a method of extending the ON time of the FET and a method of increasing an L value of the inductor. With use of those methods, a self-induced electromotive force generated after the FET is turned off becomes larger. As a result, the voltage that is finally obtained is increased without changing the number of stages of the multistage rectification circuit. However, the extension of the ON time of the FET means that a larger amount of current is taken in from a power source. This may limit the supply capacity of the power source, with the result that an influence of a conduction noise becomes larger. The current caused to be flow to the inductor is also increased, and hence an electric wire of the inductor is required to be made thick. In addition, in order to increase the L value of the inductor, the number of windings of the inductor is also required to be increased. Due to those factors, the sizes of components are increased, and the costs thereof are also increased together with the FET being a drive element. Some other methods are also conceivable, but under a condition in which the power supply voltage and the number of stages of the multistage rectification circuit cannot be changed, it is difficult to increase the output greatly without an increase in cost of each of the components.

SUMMARY OF THE INVENTION

An aspect of the present invention is a power supply apparatus capable of increasing the maximum output voltage thereof with use of a simple configuration.

Another aspect of the present invention is a power supply apparatus including an inductor, a first switching element connected to another end of the inductor, the first switching element configured to drive the inductor by being turned on or turned off in accordance with an input pulse signal, a boost converter circuit connected to both ends of the inductor and including a plurality of rectification units, the boost converter circuit configured to amplify a voltage generated in the inductor, each of the plurality of rectification units including a diode and a capacitor, and a voltage boosting element configured to supply a voltage obtained by boosting an input voltage to the inductor.

A further aspect of the present invention is an image forming apparatus including an image forming unit configured to form an image on a recording material, and a power supply apparatus configured to supply electric power to the image forming unit, the power supply apparatus including an inductor, a first switching element connected to another end of the inductor, and is configured to drive the inductor by being turned on or turned off in accordance with an input pulse signal, a boost converter circuit connected to both ends of the inductor and including a plurality of rectification units, the boost converter circuit configured to amplify a voltage generated in the inductor, each of the plurality of rectification units including a diode and a capacitor, and a voltage boosting element configured to supply a voltage obtained by boosting an input voltage to the inductor.

Further features of the present invention will become apparent from the following description of exemplary embodiments with reference to the attached drawings.

DESCRIPTION OF THE EMBODIMENTS

Now, modes for carrying out the present invention are described below in detail based on embodiments with reference to the drawings.

[Power Supply Apparatus]

Figure 1:
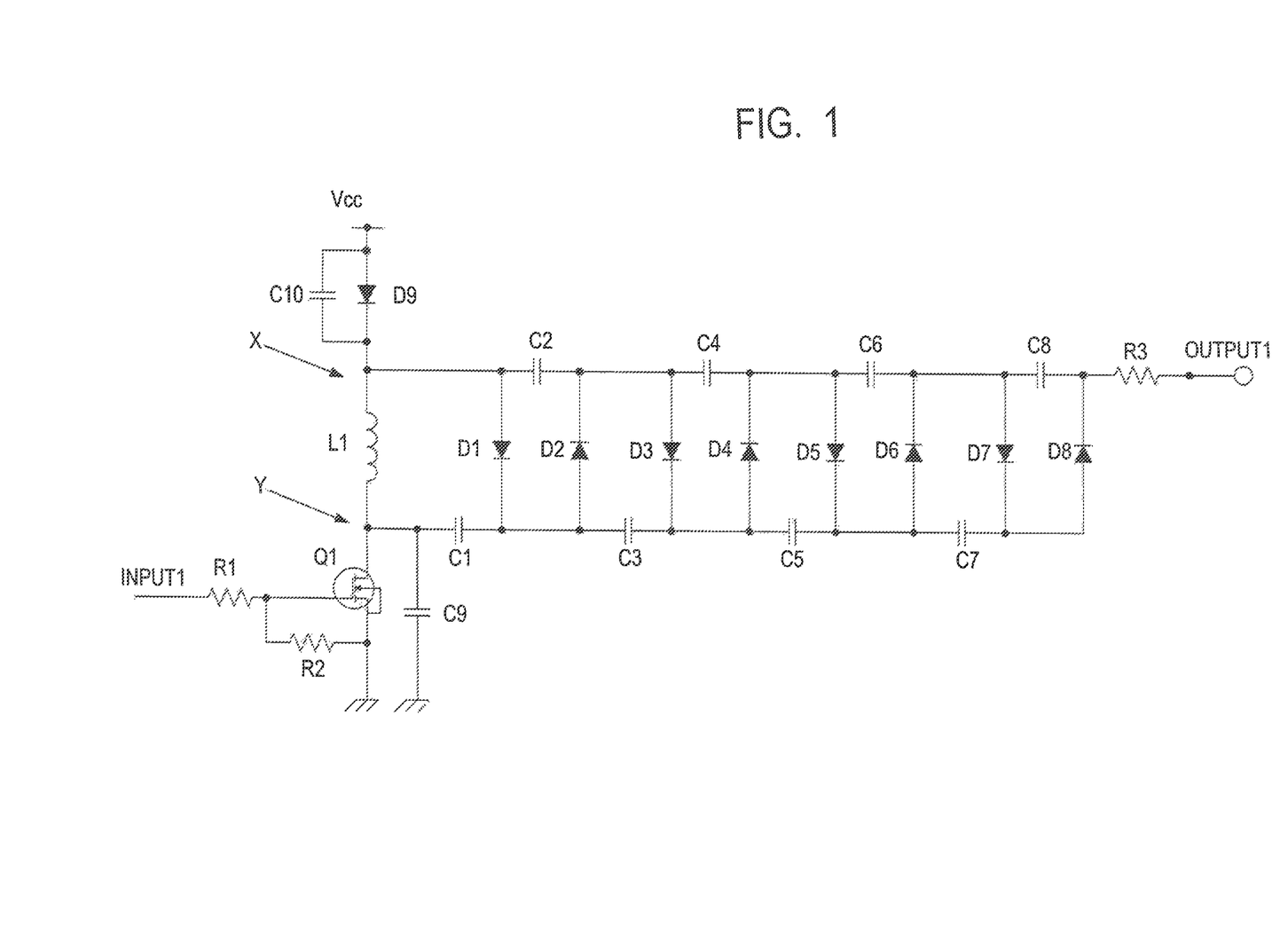
FIG. 1 is a circuit diagram of a multistage boost converter circuit in a first embodiment of the present invention.

FIG. 1 is a circuit diagram of a power supply apparatus according to a first embodiment of the present invention, and FIG. 8 is a circuit diagram of a power supply apparatus in the related-art example for comparison and reference. First, operation of a circuit of the power supply apparatus in the related-art example is described with reference to FIG. 8. In FIG. 1, the same elements as those of FIG. 8 are denoted by the same reference symbols, and description of parts overlapping with those of FIG. 8 is omitted. The power supply apparatus illustrated in FIG. 8 includes a multistage rectification circuit, and is configured to boost a voltage by repeatedly charging capacitors and adding the voltages. The power supply apparatus includes resistors R1, R2, and R3, a coil L1, a MOSFET (hereinafter referred to as "FET") Q1, which is a type of field-effect transistor, a capacitor C1 to a capacitor C9, and a diode D1 to a diode D8. Further, "Vcc" represents a DC voltage. One end of the coil L1 serving as an inductor is connected to the DC voltage Vcc serving as a voltage source. The other end of the coil L1 is connected to a drain terminal of the FET Q1 serving as a switching element.

In the power supply apparatus of FIG. 8, the FET Q1 is turned on or off in accordance with a pulse signal input to a gate terminal thereof, to thereby drive the coil L1. Further, the diode D1 and the capacitor C1, the diode D2 and the capacitor C2, and other combinations of the diodes and the capacitors each function as a rectification unit. The multistage rectification circuit is a circuit including a plurality of such rectification units. The multistage rectification circuit is connected to both ends of the coil L1, and is configured to amplify a voltage induced in the coil L1. The power supply apparatus of FIG. 8 is a power supply apparatus configured to output an output voltage boosted from the DC voltage Vcc being the power supply voltage from an output 1.

First, a square-wave pulse signal is input to an input 1 so that the FET Q1 is turned on or off. When the FET Q1 is turned on, current flows through the coil L1, and thus the coil L1 is charged with magnetic flux energy. Along with the charging of the coil L1 with energy, current flows from the diode D1 to the capacitor C1, and thus the capacitor C1 is charged. At this time, the voltage with which the capacitor C1 is charged is a voltage generated across both ends of the coil L1, that is, substantially the same voltage as the DC voltage Vcc. Next, when the FET Q1 is turned off, the coil L1 generates a voltage larger than the DC voltage Vcc at a Y portion (node of the other end of the coil L1 and the drain terminal of the FET Q1) of FIG. 8 due to self-induction of the coil L1. The capacitor C9 is responsible for suppressing the peak of a self-induced electromotive force generated at the Y portion to secure a margin with respect to a withstand voltage of the FET Q1 and to suppress noise. The high voltage generated in this manner is connected in series to the voltage with which the capacitor C1 is charged, and those voltages are added to each other so that the capacitor C2 is charged with the voltage obtained by the addition via the diode D2. An X portion (node of the one end of the coil L1 and the DC voltage Vcc) of FIG. 8 has the same voltage as the DC voltage Vcc, and the voltage with which the capacitor C2 is charged and the DC voltage Vcc are added to each other so that the capacitor C3 is charged with the voltage obtained by the addition via the diode D3. In the following stages, the same structures are provided on the right side of the diode D3 and the capacitor C3 of the circuit, and the same principle is repeatedly applied so that the voltage is amplified. Finally, the output voltage is output from the output 1.

Meanwhile, in the power supply apparatus according to the first embodiment, as compared to the related-art power supply apparatus illustrated in FIG. 8, a capacitor C10 and a diode D9 are added. In FIG. 8, the X portion indicated by the arrow is directly connected to the DC voltage Vcc. Thus, the voltage at the X portion is always the same voltage as the DC voltage Vcc. In contrast, in the power supply apparatus according to the first embodiment, the diode D9 serving as a rectification element is inserted between the DC voltage Vcc and the one end of the coil L1, and thus it is possible to increase the voltage at the X portion to be higher than the DC voltage Vcc. Therefore, in the circuit in the first embodiment illustrated in FIG. 1, due to self-induction of the coil L1 occurring after the FET Q1 is turned off, not only the voltage at the Y portion but also the voltage at the X portion varies.

Further, a voltage is generated across both ends of the diode D9, and hence the capacitor C10 serving as a first capacitance element is connected in parallel to the diode D9. With this, the three components of the capacitor C10, the coil L1, and the capacitor C9 form a series resonant circuit between the DC voltage Vcc and a ground (hereinafter referred to as "GND"). The capacitor C9 serves as a second capacitance element, and is connected between the other end of the coil L1 and the ground (GND). The energy with which the coil L1 is charged reciprocates through the capacitor C10 and the capacitor C9, and thus free oscillation of the coil L1 becomes larger and continues longer as compared to that in the related-art power supply apparatus of FIG. 8. As a reference, in FIG. 2A, there is shown an operation waveform in the related-art power supply apparatus (FIG. 8) in a case where the DC voltage Vcc is set to 24 V and the ON time of the FET Q1 is set to 1 μsec (microseconds). Further, in FIG. 2B, there is shown an operation waveform in the power supply apparatus (FIG. 1) according to the first embodiment with the same setting of values.

Figure 2A:
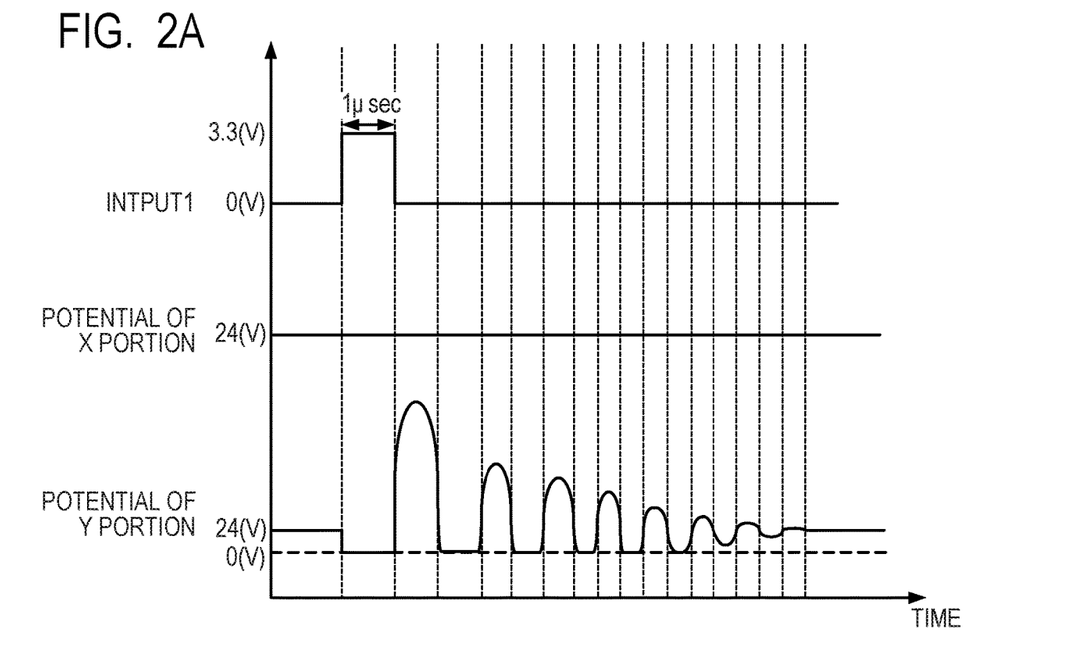
FIG. 2A and FIG. 2B are graphs for showing respective waveforms described in the first embodiment.
Figure 2B:
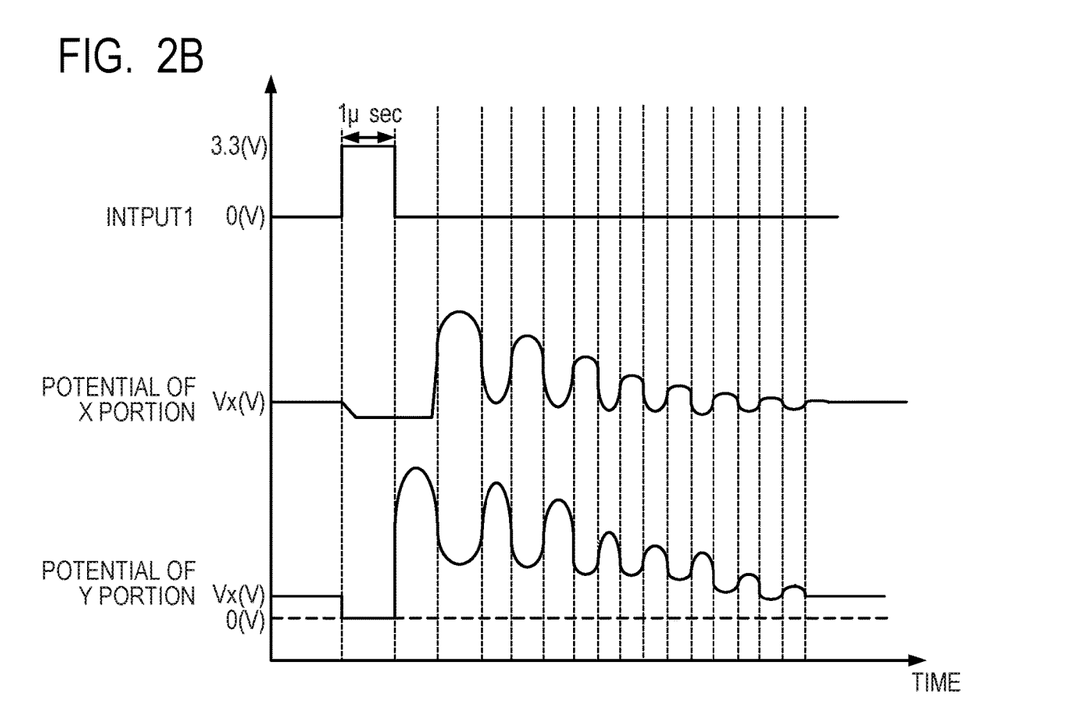

In FIG. 2A and FIG. 2B, the vertical axis indicates each of a waveform of the pulse signal (V) input to the input 1, a potential (V) at the X portion, and a potential (V) at the Y portion, and the horizontal axis indicates time in each case. The pulse signal whose unit is a voltage (V) input to the input 1 is set to, for example, 0 V when the FET Q1 is turned off, and 3.3 V when the FET Q1 is turned on, and the ON time of the pulse signal is set to 1 μsec. As shown in FIG. 2A, in the related-art power supply apparatus, after the FET Q1 is turned off, the voltage at the Y portion attenuates while repeating free oscillation whereas the voltage at the X portion is constant (DC voltage Vcc (=24 V)). Meanwhile, in the power supply apparatus according to the first embodiment, as shown in FIG. 2B, immediately after the FET Q1 is turned off, the voltage at the Y portion becomes the highest, and then the voltage at the X portion starts free oscillation with a delay corresponding to a half wave. In FIG. 2A, portions of the waveform of the free oscillation of the Y portion corresponding to 0 V or less are clamped because charges are supplied via a parasitic diode of the FET Q1. Meanwhile, in FIG. 2B, the voltage at the X portion can freely vary, and thus the voltage at the Y portion during the free oscillation becomes higher as a whole as compared to that of FIG. 2A, with the result that lower inflection points thereof are also exposed. In the circuit of FIG. 8, the X portion is connected to the DC voltage Vcc, and hence, after the free oscillation is ended, both the voltage at the X portion and the voltage at the Y portion converge at 24 V. Meanwhile, in the circuit of the first embodiment illustrated in FIG. 1, both the voltage at the X portion and the voltage at the Y portion can be 24 V or more. Therefore, a convergent voltage becomes higher as the number of times of oscillation increases, and the voltage at the X portion and the voltage at the Y portion converge at a certain voltage. This certain voltage at which the voltage at the X portion and the voltage at the Y portion converge is referred to as "voltage Vx", and is shown in FIG. 2B.

Figure 3A:
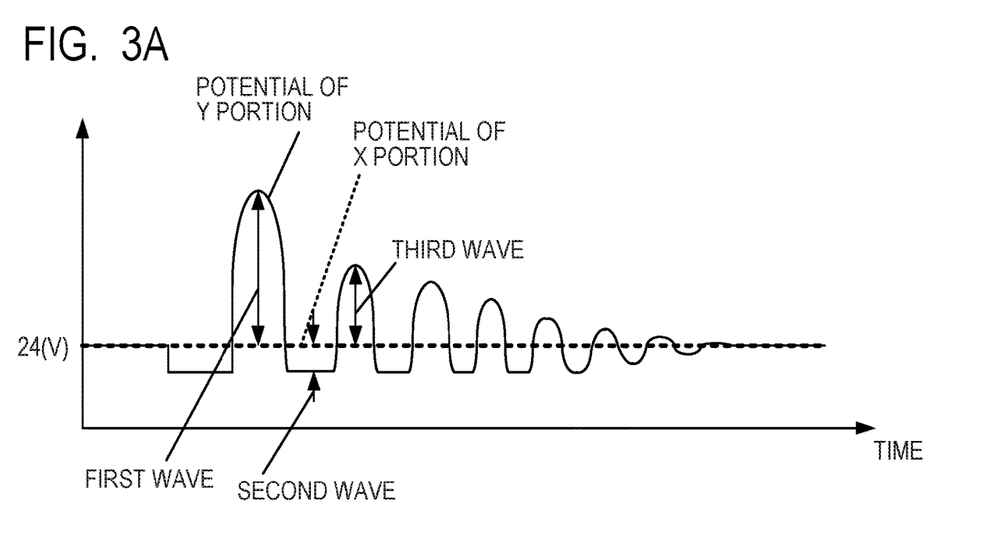
FIG. 3A and FIG. 3B are graphs for showing respective waveforms described in the first embodiment.
Figure 3B:
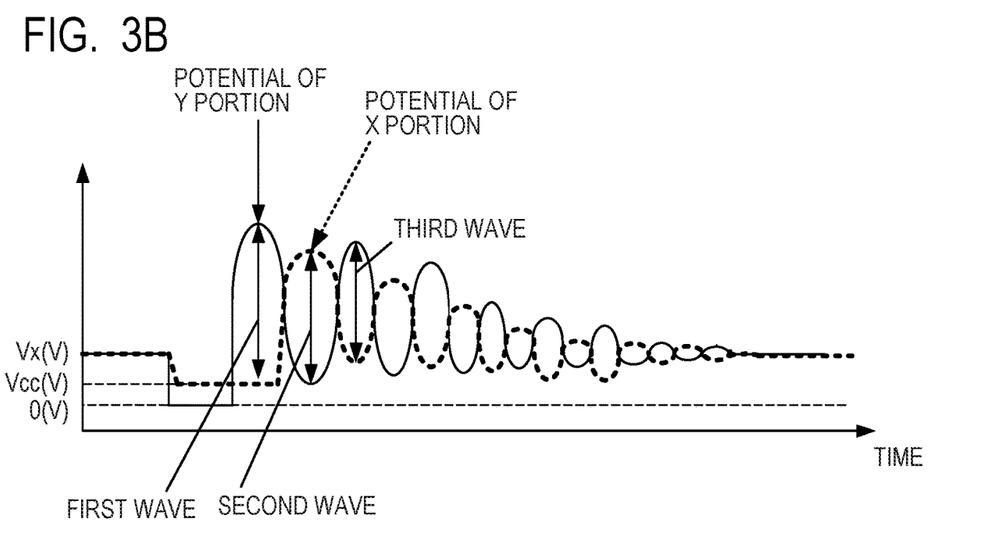

In FIG. 3A and FIG. 3B, there are shown graphs obtained by overlapping the voltage at the X portion and the voltage at the Y portion in each of FIG. 2A and FIG. 2B. The voltage at the Y portion is indicated by the solid line, and the voltage at the X portion is indicated by the broken line. FIG. 3A is a graph for showing an operation waveform of the related-art power supply apparatus, and FIG. 3B is a graph for showing an operation waveform of the power supply apparatus according to the first embodiment. In a multistage rectification unit, a voltage to be boosted is the voltage across both ends of the coil L1, and portions indicated as "first wave", "second wave", and "third wave" in FIG. 3A and FIG. 3B correspond thereto. The fact that a voltage to be boosted is the voltage across both ends of the coil L1 holds true for a fourth wave and the following waves, but denotation thereof is omitted. The first wave of the voltage across both ends of the coil L1 has the highest voltage, and thus contributes most to the final output voltage. In actuality, however, not only the first wave but also the following second wave, third wave, and waves thereafter contribute to the charging of the capacitors in the multistage rectification circuit, and have an influence on the final output voltage. This is because an amount of charges that can be supplied only with the first wave is extremely small, and due to the relationship of V=Q/C, the voltage of the capacitors in the multistage rectification circuit cannot be sufficiently increased only with the first wave.

When FIG. 3A and FIG. 3B are compared to each other based on the above, peak voltages of the first waves in FIG. 3A and FIG. 3B hardly differ from each other. However, it can be understood that peak voltages of the second waves and the following waves are larger in FIG. 3B than those in FIG. 3A. As conceivable factors thereof, there are given the fact that the voltage at the Y portion during the free oscillation has become higher, with the result that the clamped lower inflection points have become visible, and the fact that, in the circuit of FIG. 1, the amplitude of the difference between the voltages across both ends of the coil L1 has been increased by series resonance of the capacitor C10, the coil L1, and the capacitor C9. For those reasons, in the power supply apparatus according to the first embodiment, the amplitude of waveforms input to the multistage rectification circuit is increased on average, with the result that the output voltage obtained in the end is larger than that in the related-art power supply apparatus.

In addition, in FIG. 2A and FIG. 2B as well as FIG. 3A and FIG. 3B, for easy understanding, there are shown waveforms obtained when one shot of pulse signal is input to the input 1. In actuality, however, a plurality of pulse signals are input in order to maintain the output voltage and keep currents flowing. At that time, when the voltage at the Y portion at the time immediately before the FET Q1 is turned on is in free oscillation, the output voltage is influenced by a phase of the voltage at the Y portion at the moment when the FET Q1 is turned on (or phase of the current flowing through the coil L1). In the first embodiment, it is possible to increase a substantial output voltage as compared to the related-art example irrespective of the phase of the voltage at the Y portion at the moment when the FET Q1 is turned on. However, when comparison is made between the increase amounts of the output of the related-art power supply apparatus and the power supply apparatus according to the first embodiment, it is required to pay attention to, for example, setting the phases at the moment when the FET Q1 is turned on to be the same.

It is preferred that the capacitor C10 be provided so that output capacity is efficiently improved, but the power supply apparatus according to the first embodiment can operate even without the capacitor C10. The position at which the capacitor C10 is connected is not limited to that illustrated in FIG. 1 as long as series resonance can be performed by the capacitor C9, the coil L1, and the capacitor C10. For example, the capacitor C10 may be connected between a cathode of the diode D9 and the GND. Further, the diode D9 is used in the first embodiment, but the core of the present invention resides in that the voltage at the X portion can be increased as compared to the X portion in the related-art power supply apparatus, which has the same potential as the DC voltage Vcc. Therefore, as a device configured to increase the voltage at the X portion, devices other than the diode, for example, a switching element, for example, an optical semiconductor element, may be used instead. As described above, according to the first embodiment, it is possible to increase the maximum output voltage of the power supply apparatus with use of a simple configuration (only by adding inexpensive components).

[Configuration and Operation of Power Supply Apparatus]

Figure 4:
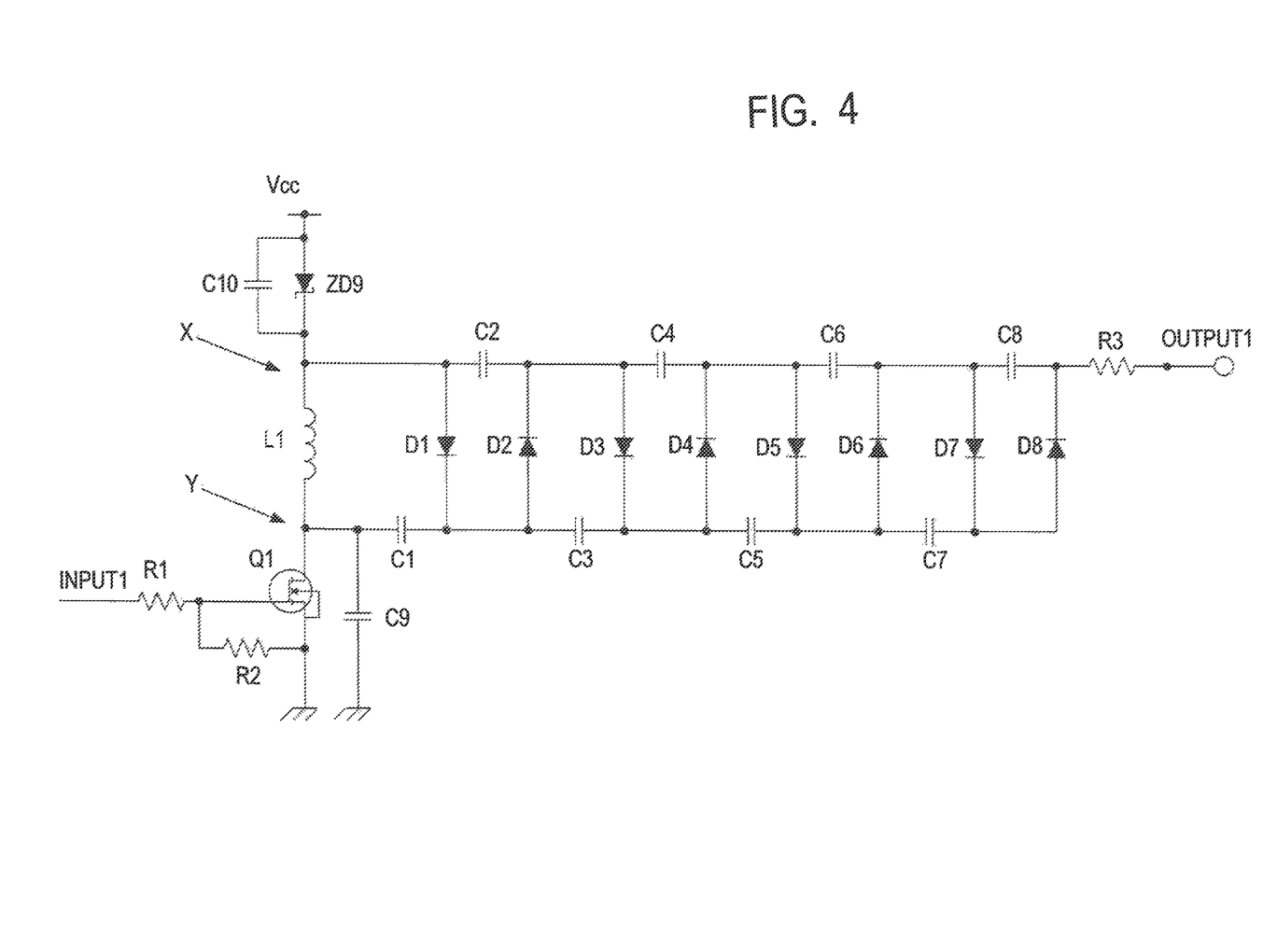
FIG. 4 is a circuit diagram of a multistage boost converter circuit in a second embodiment of the present invention.
Figure 5A:
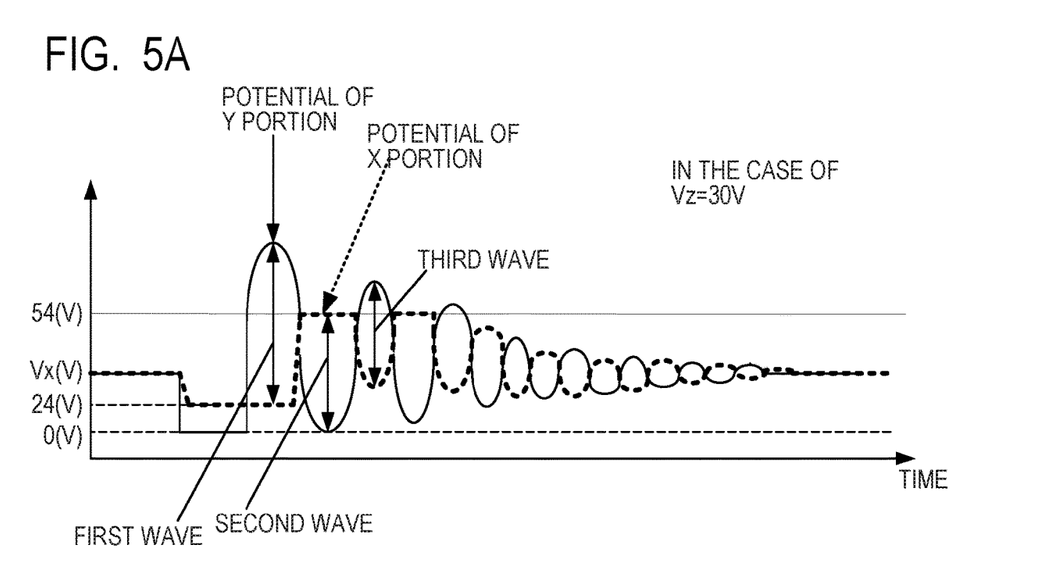
FIG. 5A and FIG. 5B are graphs for showing respective waveforms in the second embodiment.
Figure 5B:
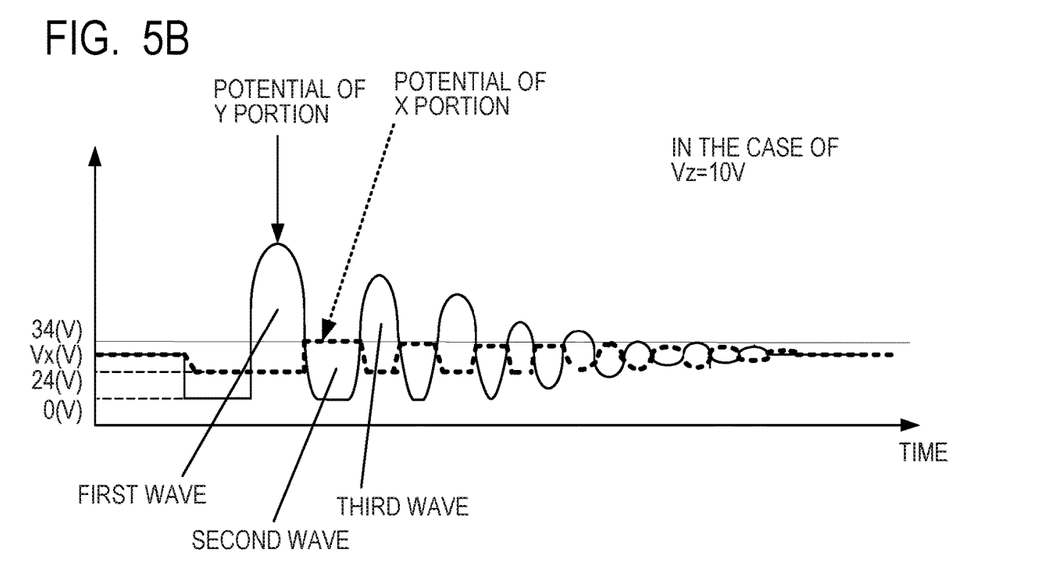

A second embodiment of the present invention is illustrated in FIG. 4. The second embodiment is an example in which the diode D9 is replaced with a Zener diode ZD in the circuit of the power supply apparatus illustrated in FIG. 1. FIG. 4 is a circuit diagram for illustrating a power supply apparatus according to the second embodiment. The same components as those of the first embodiment are denoted by the same reference symbols, and description thereof is omitted. In the power supply apparatus according to the second embodiment, the Zener diode ZD9 is connected between the DC voltage Vcc and the one end of the coil L1, and has a function of increasing a voltage at a node of the one end of the coil L1 and the Zener diode ZD9 to be higher than the DC voltage Vcc. The Zener diode ZD9 has a cathode terminal connected to the one end of the coil L1 and an anode terminal connected to the DC voltage Vcc. The X portion is a node of the one end of the coil L1 and the cathode terminal of the Zener diode ZD9. FIG. 5A is a graph for showing an operation waveform in a case where a Zener voltage Vz of the Zener diode ZD9 is 30 V, and FIG. 5B is a graph for showing an operation waveform in a case where the Zener voltage Vz of the Zener diode ZD9 is 10 V. The potential at the Y portion is indicated by the solid line, and the potential at the X portion is indicated by the broken line.

As understood from FIG. 5A, the voltage at the X portion is clamped at 54 V (=24 V+30 V) by the Zener diode ZD9, and does not exceed 54 V. At the same time, the central voltage of the free oscillation decreases, and hence a bottom (bottom portion of the second wave) of the oscillation waveform of the Y portion is changed to a lower voltage as compared to that of FIG. 3B (operation waveform in the first embodiment). With upper portions of the potential at the X portion being clamped, part of charges is lost, and hence the energy of the free oscillation decreases. That is, the power supply apparatus according to the second embodiment can be regarded as having a middle state between the state of the related-art power supply apparatus (FIG. 3A) and the state of the power supply apparatus according to the first embodiment (FIG. 3B), and the degree of the state of being middle can be changed with use of the Zener voltage Vz of the Zener diode ZD9.

For example, as shown in FIG. 5B, when the Zener voltage Vz is changed from 30 V to 10 V, the amplitude of the X portion further decreases, and along with that, an amplitude center of the Y portion further drops. The amplitude of each wave becomes smaller, and thus the output voltage also drops. When the Zener voltage Vz is further decreased, a state in which the Zener voltage Vz is zero, that is, a state that is the same as a state in which the Zener diode ZD9 is not connected, is obtained. Also from this fact, it can be understood that lowering the Zener voltage Vz of the Zener diode ZD9 corresponds to generating the middle state between the state of the related-art power supply apparatus and the power supply apparatus according to the first embodiment.

There are obtained two advantages by making such a middle state. The first advantage resides in that the output voltage can be finely adjusted. Generally speaking, the multistage rectification unit is a circuit configured to increase the original voltage generated in the coil L1 by several times. Accordingly, when it is assumed that the voltage generated in the coil L1 is increased by 1.5 times through replacement of the related-art circuit of FIG. 8 with the circuit in the first embodiment illustrated in FIG. 1, and is increased by 3 times by the multistage rectification unit, the voltage output from the output 1 is increased by 4.5 times (1.5*3=4.5) as compared to that in the related-art example (FIG. 8). However, depending on specifications, the voltage output from the output 1 is preferred to be increased by about 4 times. In this case, for example, there are given a method of changing the frequency of the signal applied to the input 1 and a method of changing the voltage of the DC voltage Vcc, to thereby adjust the voltage output from the output 1. However, as another option, the voltage output from the output 1 can be adjusted by the Zener voltage Vz, which is obtained by replacing the diode D9 of FIG. 1 with the Zener diode ZD9, as in the second embodiment. Through adjustment of the Zener voltage Vz, the voltage generated in the coil L1 in the case where the related-art circuit in FIG. 8 is replaced with the circuit in the first embodiment illustrated in FIG. 1 can be amplified by between 1 time and 1.5 times in the above-mentioned example. Accordingly, when a voltage increased by about 4 times is desired to be obtained at the output 1, it is only required to set the Zener voltage Vz so that the voltage of the coil L1 is about 1.33 (4/3=1.33) times.

Further, the second advantage resides in that it is possible to adjust a balance of noise and the increase amount of the output of the related-art power supply apparatus (FIG. 8). In the second embodiment, in order to increase the output, the amplitude of the free oscillation is increased. With this, there is a risk in that a terminal noise or an electromagnetic noise, for example, a radio frequency interference (RFI), may increase (however, such a noise depends on a filter of the power source and a configuration of a main body, and hence those noises do not necessarily increase). As described above, through adjustment of the Zener voltage Vz, it is possible to obtain a middle output voltage between the output voltage of the related-art power supply apparatus and the output voltage of the power supply apparatus according to the first embodiment. This holds true also for the noise intensity, and hence the noise intensity may be adjusted with use of the Zener voltage Vz when the noise and the increase amount of the output have a trade-off relationship. As described above, according to the second embodiment, it is possible to increase the maximum output voltage of the power supply apparatus with use of a simple configuration (only by adding inexpensive components).

[Capacitance of Capacitors C9 and C10]

In a third embodiment of the present invention, the capacitance of each of the capacitor C10 and the capacitor C9 in the first embodiment and the second embodiment is described. As described above, it is only required that the diode D9 or a device configured to increase the potential at the X portion, for example, the Zener diode ZD9, be connected between the one end of the coil L1 and the DC voltage Vcc, and the power supply apparatus can operate even without the capacitor C10 and the capacitor C9. However, the efficiency of the boost converter circuit is significantly changed. This point is described in detail in the circuit in the second embodiment with use of actual numerical values. In the circuit of FIG. 4 for illustrating the power supply apparatus according to the second embodiment, values of respective elements and the like are set as follows. The DC voltage Vcc is set to 12 V, an inductance of the coil L1 is set to 220 pH, a resistance value of the resistor R1 is set to 270Ω, and a resistance value of the resistor R2 is set to 33 kΩ. Further, a capacitance of each of the capacitor C1 to the capacitor C8 is set to 4,700 pF, a resistance value of the resistor R3 is set to 1.12 MΩ, and the Zener voltage Vz of the Zener diode ZD9 is set to 28 V. The pulse signal input to the input 1 is set to have an ON time of 1 μsec and a frequency of 10 kHz. Further, waveforms on an oscilloscope obtained when the power supply apparatus is caused to operate under respective conditions are shown in FIG. 6A, FIG. 6B, FIG. 6C, FIG. 6D, and FIG. 6E.

[Operation Waveforms under Respective Conditions]

Figure 6A:
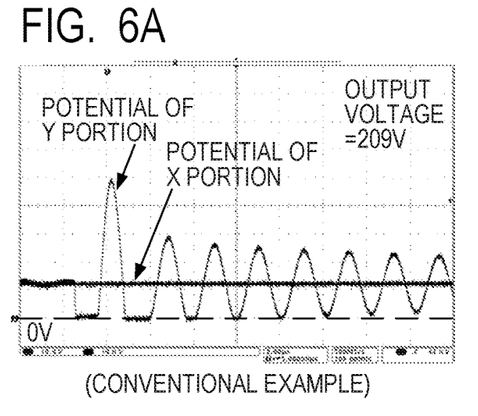
FIG. 6A, FIG. 6B, FIG. 6C, FIG. 6D, and FIG. 6E are graphs for showing respective waveforms described in a third embodiment of the present invention.
Figure 6B:
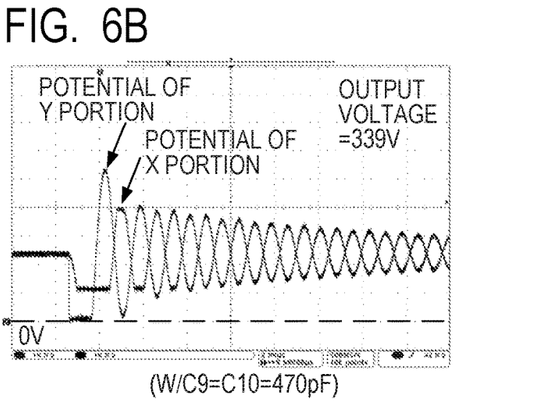
Figure 6C:
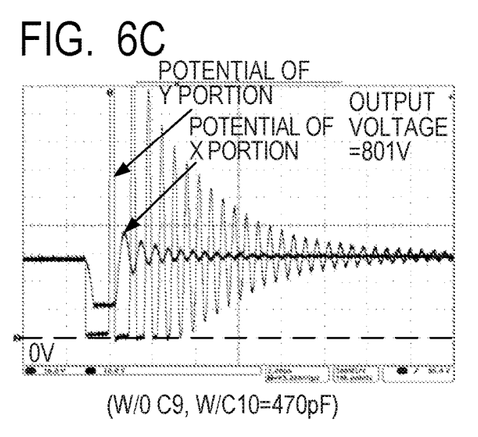
Figure 6D:
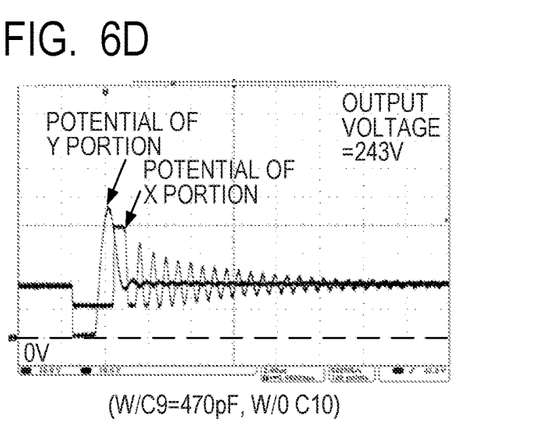
Figure 6E:
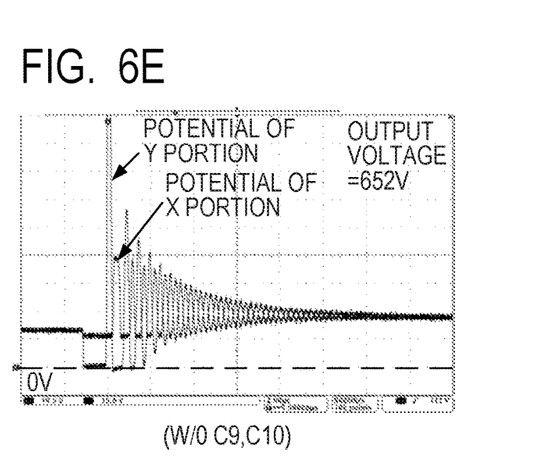

FIG. 6A is an illustration of a waveform obtained when the related-art power supply apparatus (FIG. 8) is caused to operate. FIG. 6B is an illustration of a waveform obtained when capacitors having substantially the same capacitance, namely, capacitors each having a capacitance of 470 pF, are connected as the capacitor C9 and the capacitor C10 in the power supply apparatus according to the second embodiment (FIG. 4). FIG. 6C is an illustration of a waveform obtained when a capacitor having a capacitance of 470 pF is connected as the capacitor C10 and the capacitor C9 is not connected (without capacitor C9) in the power supply apparatus according to the second embodiment (FIG. 4). FIG. 6D is an illustration of a waveform obtained when a capacitor having a capacitance of 470 pF is connected as the capacitor C9 and the capacitor C10 is not connected (without capacitor C10) in the power supply apparatus according to the second embodiment (FIG. 4). FIG. 6E is an illustration of a waveform obtained when neither the capacitor C9 nor the capacitor C10 is connected (without capacitors C9 and C10) in the power supply apparatus according to the second embodiment (FIG. 4). The output voltage (value observed with use of a tester at the output 1) under each condition is shown in the upper right part of each graph.

Both the capacitor C9 and the capacitor C10 are connected in the second embodiment, and hence the operation waveform of the power supply apparatus according to the second embodiment corresponds to that shown in the graph of FIG. 6B. In the second embodiment of FIG. 6B, the output voltage is increased to 339 V as compared to 209 V in the example of the related art of FIG. 6A. Next, the focus is put on FIG. 6C. In FIG. 6C, the capacitor C9 is absent, and hence an impedance of the Y portion is high, and a peak voltage at the Y portion due to ringing occurring after the FET Q1 is turned off is extremely high. Meanwhile, the waveform of the X portion does not greatly change because the capacitor C10 is present. When the peak voltage at the Y portion becomes high in this manner, the output voltage increases as a matter of course, and the highest output voltage (801 V) among those of FIG. 6A to FIG. 6E is achieved in FIG. 6C. However, the following are concerns in the case of FIG. 6C. Specifically, for example, there are given facts that a higher voltage is applied to the FET Q1 because the peak voltage at the Y portion is high, that noise may be increased because the frequency of the ringing is high, and that respective components of the multistage rectification circuit are required to have a high withstand voltage because the output voltage is high.

Next, the focus is put on FIG. 6D. In FIG. 6D, the capacitor C10 is absent, and hence an impedance of the X portion is high. Therefore, ringing exhibiting a high peak voltage as that at the Y portion of FIG. 6C may occur without the Zener diode ZD9. However, the Zener diode ZD9 having the Zener voltage Vz of 28 V is connected, and hence portions of 40 V or more obtained by adding the DC voltage Vcc of 12 V to the Zener voltage Vz of 28 V are clamped. As a result, the output voltage is higher than that in the example of the related art of FIG. 6A, but is lower (243 V) than that of FIG. 6C.

Next, the focus is put on FIG. 6E. In FIG. 6E, neither the capacitor C9 nor the capacitor C10 is connected, but resonance itself occurs because the Zener diode ZD9 and the FET Q1 have parasitic capacitances. However, with those parasitic capacitances being very small, the frequency of the resonance due to the parasitic capacitances is high, and hence there is a great concern about the noise. Similarly, with those parasitic capacitances being very small, the storable energy is also small, and hence a peak voltage at the Y portion due to ringing is high, but not as high as that of FIG. 6C. Therefore, the output voltage is also smaller (652 V) than that of FIG. 6C.

From the above-mentioned consideration, the circuit corresponding to FIG. 6C is preferred when only a high output voltage is desired to be obtained, but as to this circuit, there is a concern about the withstand voltage of the components and the noise. Further, the circuit corresponding to FIG. 6E is preferred when the number of components is desired to be reduced, but as to this circuit, similarly to the circuit corresponding to FIG. 6C, there is a concern about the withstand voltage of the FET Q1 and the noise. In addition, the circuits corresponding to FIG. 6C and FIG. 6E are liable to be affected by variations of parasitic capacitances of the components. Those parasitic capacitances have small absolute values, and hence have a significant influence on the waveforms and the output voltage when the parasitic capacitances are varied even slightly, with the result that the power supply apparatus have great variations.

Consequently, it can be said that the circuit corresponding to FIG. 6B, in which the capacitance elements are connected and the voltage and the frequency at the Y portion are intentionally reduced, has a good balance. However, when the capacitances of the capacitor C9 and the capacitor C10 are set excessively large, the waveforms of the X portion and the Y portion are rounded as a matter of course, and hence the peak potential drops. As a result, the output voltage also drops. In view of the above, at the time of designing the power supply apparatus, it is preferred to seek the optimum capacitance values while the balance of the withstand voltage of the FET Q1, noise, and the output voltage is adjusted. As described above, according to the third embodiment, it is possible to increase the maximum output voltage of the power supply apparatus with use of a simple configuration (only by adding inexpensive components).

The power supply apparatus described in each of the first to third embodiments is applicable as a power source configured to supply electric power to units that require high voltages in, for example, an image forming apparatus. A description is now given of a configuration of an image forming apparatus to which one of the power supply apparatus according to the first to third embodiments is applied.

[Configuration of Image Forming Apparatus]

Figure 7:
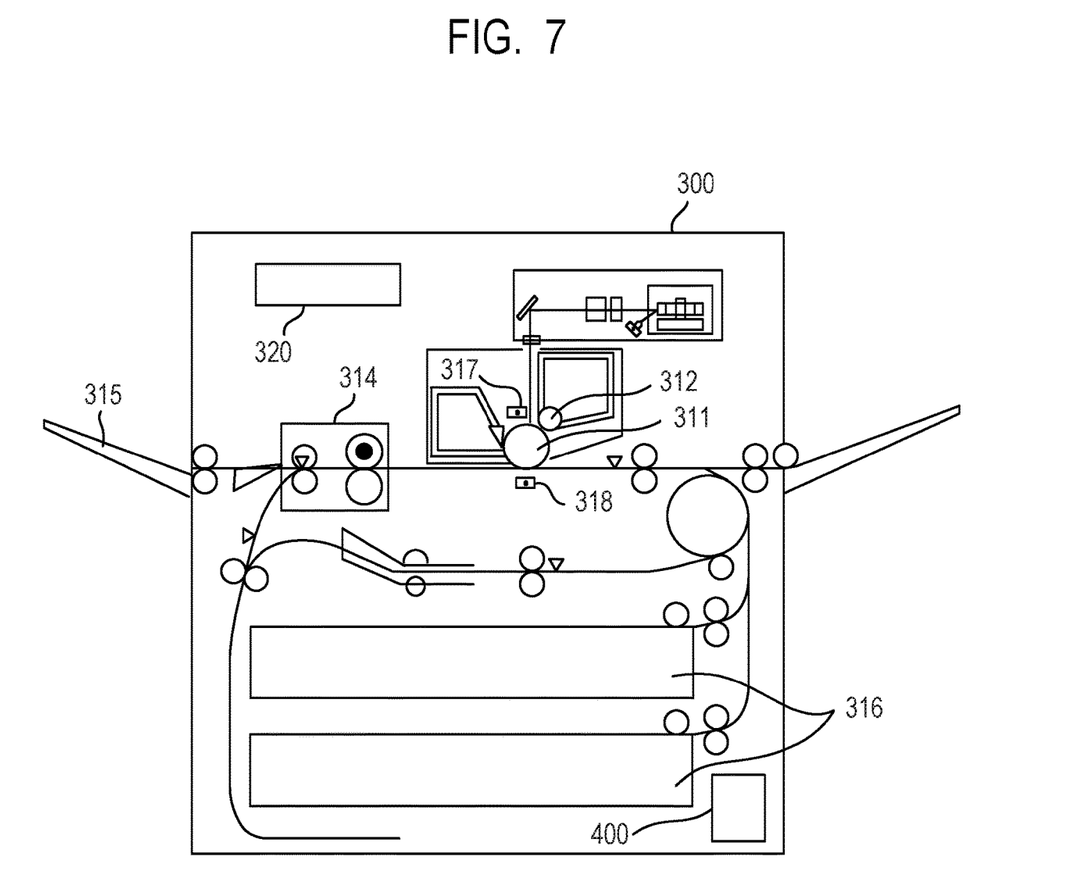
FIG. 7 is a diagram for illustrating a configuration of an image forming apparatus according to a fourth embodiment of the present invention.

A laser beam printer is described as an example of the image forming apparatus according to a fourth embodiment of the present invention. In FIG. 7, a schematic configuration of the laser beam printer as an example of an electrophotographic printer is illustrated. A laser beam printer 300 includes a photosensitive drum 311 serving as an image bearing member on which an electrostatic latent image is to be formed, a charging device 317 (charging unit) configured to uniformly charge the photosensitive drum 311, and a developing device 312 (developing unit) configured to develop the electrostatic latent image formed on the photosensitive drum 311 with toner. A toner image developed on the photosensitive drum 311 is transferred by a transfer device 318 as a transfer unit onto a sheet (not shown) that is a recording material supplied from a cassette 316, as a transfer member. The toner image transferred onto the sheet is fixed by a fixing device 314 and is discharged to a tray 315. The photosensitive drum 311, the charging unit 317, the developing device 312, and the transfer device 318 correspond to an image forming unit.

The laser beam printer 300 further includes a power supply apparatus 400 described in the first to third embodiments. The power supply apparatus 400 is a high-voltage power source configured to supply a required voltage to the charging device 317 and a required high voltage to the developing device 312 and the transfer device 318, for example. The image forming apparatus to which the power supply apparatus 400 according to the first to third embodiments is applicable is not limited to the one exemplified in FIG. 7. For example, the image forming apparatus may include a plurality of image forming units. Further, as the transfer unit, the image forming apparatus may include the transfer device having a primary transfer device configured to transfer the toner image formed on the photosensitive drum 311 onto an intermediate transfer belt, and a secondary transfer device configured to transfer the toner image formed on the intermediate transfer belt onto a sheet.

The laser beam printer 300 includes a controller 320 configured to control an image forming operation by the image forming unit and a sheet conveying operation. For example, the controller 320 may input a pulse signal from the input 1 (see FIG. 1) to the FET Q1. As described above, according to the fourth embodiment, it is possible to employ the power supply apparatus whose maximum output voltage is increased with use of a simple configuration, as the power supply apparatus (high-voltage power supply apparatus) of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-098969, filed May 18, 2017, which is hereby incorporated by reference herein in its entirety.

What is claimed is:

1. A power supply apparatus comprising:
an inductor;
a boost converter circuit connected to the inductor and including a plurality of rectification units, the boost converter circuit configured to amplify a voltage generated in the inductor, each of the plurality of rectification units including a diode and a capacitor;
a first switching element connected to a side opposite to a side on which a voltage is supplied into the inductor in series with the inductor, the first switching element configured to drive the inductor by being turned on or turned off in accordance with an input pulse signal;
a voltage boosting element connected to a side on which the voltage is supplied to the inductor;
a first capacitance element connected in parallel to the voltage boosting element; and
a second capacitance element connected between the side opposite to the side on which the voltage is supplied into the inductor with regard to the inductor and a ground,
wherein in a case where the first switching element drives the inductor, a value of a voltage at the side opposite to the side on which the voltage is supplied into the inductor is changed to a first value and a second value smaller than the first value, and a value of a voltage at the side on which the voltage is supplied into the inductor is changed to a third value and a fourth value smaller than the third value, and
wherein, in a case where the value of the voltage at the side opposite to the side on which the voltage is supplied into the inductor is the second value, the value of the voltage at the side on which the voltage is supplied into the inductor is the third value.

2. The power supply apparatus according to claim 1, wherein the voltage boosting element includes a rectification element or a constant-voltage element.

3. The power supply apparatus according to claim 2, wherein one of the rectification element and the constant-voltage element includes a diode, and wherein the diode includes an anode terminal connected to a voltage source and a cathode terminal connected to one end of the inductor.

4. The power supply apparatus according to claim 2, wherein one of the rectification element and the constant-voltage element includes a Zener diode, and the Zener diode includes an anode terminal connected to a voltage source and a cathode terminal connected to one end of the inductor.

5. The power supply apparatus according to claim 1 wherein the first capacitance element and the second capacitance element have substantially the same capacitance.

6. The power supply apparatus according to claim 1, further comprising a capacitance element connected between the first portion on the side opposite to the side on which the voltage is supplied into the inductor with regard to the inductor and a ground.

7. The power supply apparatus according to claim 1, wherein the third value is larger than the second value.

8. The power supply apparatus according to claim 1, wherein in a case where the value of a voltage at the side opposite to the side on which the voltage is supplied into the inductor is changed to the first value and the second value by driving the first switching element, the value of a voltage increases to the first value from a base voltage and then decreases to the second value from the first value, and in a case where the value of a voltage at the side on which a voltage is supplied into the inductor is changed to the third value and the fourth value, the value of a voltage increases to the third value from the base voltage and then decreases to the fourth value from the first value by driving the first switching element, and wherein a timing to reach the third value from the base voltage is later than a timing to reach the first value from the base voltage.

9. An image forming apparatus comprising:
an image forming unit configured to form an image on a recording material; and
a power supply apparatus configured to supply electric power to the image forming unit,
the power supply apparatus including:
an inductor;
a boost converter circuit connected to the inductor and including a plurality of rectification units, the boost converter circuit configured to amplify a voltage generated in the inductor, each of the plurality of rectification units including a diode and a capacitor;
a first switching element connected to a side opposite to a side on which a voltage is supplied into the inductor in series with the inductor, the first switching element configured to drive the inductor by being turned on or turned off in accordance with an input pulse signal;
a voltage boosting element connected to a side on which the voltage is supplied to the inductor;
a first capacitance element connected in parallel to the voltage boosting element; and
a second capacitance element connected between a side opposite to the side on which the voltage is supplied into the inductor with regard to the inductor and a ground,
wherein in a case where the first switching element drives the inductor a value of a voltage at the side opposite to the side on which the voltage is supplied into the inductor is changed to a first value and a second value smaller than the first value, and a value of a voltage at the side on which the voltage is supplied into the inductor is changed to a third value and a fourth value smaller than the third value, and
wherein in a case where the value of the voltage at the side opposite to the side on which the voltage is supplied into the inductor is the second value, the value of the voltage at the side on which the voltage is supplied into the inductor is the third value.

10. The image forming apparatus according to claim 9, wherein the voltage boosting element includes a rectification element or a constant-voltage element.

11. The image forming apparatus according to claim 10, wherein one of the rectification element and the constant-voltage element includes a diode, and wherein the diode includes an anode terminal connected to a voltage source and a cathode terminal connected to one end of the inductor.

12. The image forming apparatus according to claim 10, wherein one of the rectification element and the constant-voltage element includes a Zener diode, and the Zener diode includes an anode terminal connected to a voltage source and a cathode terminal connected to one end of the inductor.

13. The image forming apparatus according to claim 9, wherein the first capacitance element and the second capacitance element have substantially the same capacitance.

14. The image forming apparatus according to claim 9, further comprising a capacitance element connected between the first portion on the side opposite to the side on which the voltage is supplied into the inductor with regard to the inductor and a ground.

15. The image forming apparatus according to claim 9, wherein the image forming unit includes any one of: a charging device configured to charge an image bearing member; a developing device configured to develop a latent image formed on the image bearing member as an image with use of toner; and a transfer device configured to transfer the image formed on the image bearing member onto a transfer member.

16. The image forming apparatus according to claim 9, wherein the third value is larger than the second value.

17. The image forming apparatus according to claim 9, wherein in a case where the value of a voltage at the side opposite to the side on which the voltage is supplied into the inductor is changed to the first value and the second value by driving the first switching element, the value of a voltage increases to the first value from a base voltage and then decreases to the second value from the first value, and in a case where the value of a voltage at the side on which the voltage is supplied into the inductor is changed to the third value and the fourth value, the value of a voltage increases to the third value from the base voltage and then decreases to the fourth value from the first value by driving the first switching element, and wherein a timing to reach the third value from the base voltage is later than a timing to reach the first value from the base voltage.

* * * * *